US010752517B2

(12) United States Patent
Betts

(10) Patent No.: US 10,752,517 B2
(45) Date of Patent: Aug. 25, 2020

(54) PRODUCTION SALT WATER RECYCLE/TREATMENT PROCESS

(71) Applicant: J. Keith Betts, Kemp, TX (US)

(72) Inventor: J. Keith Betts, Kemp, TX (US)

( * ) Notice: Subject to any disclaimer, the term of this patent is extended or adjusted under 35 U.S.C. 154(b) by 0 days.

(21) Appl. No.: 16/220,667

(22) Filed: Dec. 14, 2018

(65) Prior Publication Data
US 2019/0119129 A1 Apr. 25, 2019

Related U.S. Application Data

(62) Division of application No. 15/177,131, filed on Jun. 8, 2016, now Pat. No. 10,173,906.
(Continued)

(51) Int. Cl.
| | |
|---|---|
| *C02F 1/04* | (2006.01) |
| *B01D 1/00* | (2006.01) |
| *B01D 17/02* | (2006.01) |
| *C02F 1/40* | (2006.01) |
| *C02F 103/10* | (2006.01) |
| *C02F 101/10* | (2006.01) |
| *C02F 101/32* | (2006.01) |
| *C02F 103/36* | (2006.01) |

(52) U.S. Cl.
CPC ............ *C02F 1/048* (2013.01); *B01D 1/0058* (2013.01); *B01D 1/0064* (2013.01); *B01D 1/0082* (2013.01); *B01D 17/02* (2013.01); *C02F 1/40* (2013.01); *C02F 2101/10* (2013.01); *C02F 2101/32* (2013.01); *C02F 2103/10* (2013.01); *C02F 2103/365* (2013.01); *C02F 2201/008* (2013.01); *C02F 2209/008* (2013.01); *C02F 2209/02* (2013.01); *C02F 2209/03* (2013.01); *C02F 2209/42* (2013.01)

(58) Field of Classification Search
CPC ......... C02F 1/048; B01D 17/02; B01D 1/058; B01D 1/0064; B01D 1/0082
See application file for complete search history.

(56) References Cited

U.S. PATENT DOCUMENTS

| 6,090,186 A | 7/2000 | Spencer |
| 7,340,949 B1 * | 3/2008 | Hage ...................... G01W 1/14 |
| | | 73/170.17 |

(Continued)

OTHER PUBLICATIONS

Notice of Allowance dated Jun. 11, 2019; U.S. Appl. No. 16/220,659, filed Dec. 14, 2018; 5 pages.
(Continued)

*Primary Examiner* — Brian A McCaig
(74) *Attorney, Agent, or Firm* — Conley Rose, P.C.; Grant Rodolph

(57) ABSTRACT

A skid-mounted system, for recycling production salt water from an oil well, may include a skid housing; a separation tank enclosed within the skid housing; a control system enclosed within the skid housing; a salt water port configured to be connected to a supply of salt water and transfer the salt water to the separation tank; a fuel port configured to be connected to a fuel supply and provide fuel to a burner attached to the separation tank; an exhaust stack that is connected to the separation tank and that is configured to exhaust hot gas produced by the burner to an environment; and a steam stack that is connected to the separation tank and that is configured to release steam produced by the separation tank.

20 Claims, 9 Drawing Sheets

Related U.S. Application Data

(60) Provisional application No. 62/172,592, filed on Jun. 8, 2015.

(56) References Cited

U.S. PATENT DOCUMENTS

| | | | |
|---|---|---|---|
| 9,360,848 B2 * | 6/2016 | Bonnelye | B01D 61/025 |
| 10,173,906 B2 | 1/2019 | Betts | |
| 2004/0261952 A1 * | 12/2004 | Hart | B01D 1/0058 159/47.3 |
| 2011/0017584 A1 | 1/2011 | Stevenson et al. | |
| 2011/0067995 A1 | 3/2011 | Lusk | |
| 2012/0145386 A1 | 6/2012 | Bjorklund et al. | |
| 2012/0270275 A1 | 10/2012 | Fenton et al. | |
| 2015/0190728 A1 | 7/2015 | Hudgens | |

OTHER PUBLICATIONS

Office Action dated Feb. 19, 2019; U.S. Appl. No. 16/220,659, filed Dec. 14, 2018; 17 pages.
Betts, J. Keith; U.S. Appl. No. 16/220,659, filed Dec. 14, 2018; Title: Production Salt Water Recycle/Treatment Process; 35 pages.
Office Action dated Jan. 26, 2018; U.S. Appl. No. 15/177,131, filed Jun. 8, 2016; 14 pages.
Final Office Action dated Jun. 25, 2018; U.S. Appl. No. 15/177,131, filed Jun. 8, 2016; 9 pages.
Notice of Allowance dated Sep. 5, 2018; U.S. Appl. No. 15/177,131, filed Jun. 8, 2016; 5 pages.

* cited by examiner

PRODUCTION SALT WATER RECYCLE/TREATMENT PROCESS

CROSS-REFERENCE TO RELATED APPLICATIONS

The present application is a divisional of U.S. patent application Ser. No. 15/177,131 filed Jun. 8, 2016 by J. Keith Betts entitled "Production Salt Water Recycle/Treatment Process," which claims priority to U.S. Provisional Patent Application No. 62/172,592 filed Jun. 8, 2015 by Keith Betts entitled "Production Salt Water Disposal Process," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In the production of hydrocarbons, salt water is often produced along with the hydrocarbons. The production salt water may result from various sources including naturally occurring water within a subterranean formation and/or water recovered after it is injected into the formation as part of a treatment procedure (e.g., formation stimulation, water or steam flooding, etc.). Owing to the natural salts within the subterranean formation, the production salt water is typically saturated in various naturally occurring salts at the time it is produced. The production salt water must be disposed of since it can result in environmental damage if released on the surface due to the high salt content.

SUMMARY

In an embodiment, the disclosure includes a method for recycling/disposing of production salt water, in which production salt water from an oil well is received. The production salt water is separated into separate streams of salt water and oil. The salt water is pre-heated to a temperature no less than 2 degrees Fahrenheit (° F.) below the boiling point of the salt water. The pre-heated salt water is transferred to a separation tank, and the heated salt water is separated in the separation tank into steam and salt by boiling water.

In another embodiment, the disclosure includes a system for recycling/disposing of production salt water that comprises a salt water inlet valve, a separation tank, a burner tube, a steam exhaust, a salt valve, and a control system. The separation tank is configured to receive salt water from the salt water inlet valve. The burner tube is located within the separation tank and is configured to pass hot gas through the separation tank and boil the salt water. The steam exhaust is configured to release steam produced by the separation tank. The salt valve is configured to release salt produced by the separation tank. The control system is communicatively coupled to the salt water inlet valve and the salt valve, and the control system is configured to control operations of the salt water inlet valve and the salt valve. The control system is configured to open the salt water inlet valve to flow the salt water into the separation tank based on a temperature of the salt water within the separation tank, and the control system is configured to periodically open the salt valve to release the salt produced by the separation tank.

In yet another embodiment, the disclosure includes a skid-mounted system for recycling/disposing of production salt water that comprises a skid housing, a plurality of separation tanks enclosed within the skid housing, a control system enclosed within the skid housing, an outer salt water port, an outer fuel port, a plurality of exhaust stacks, and a plurality of steam stacks. The outer salt water port is configured to be connected to a supply of salt water and transfer the salt water to the plurality of separation tanks. The outer fuel port is configured to be connected to a fuel supply and provide the fuel to burners attached to the plurality of separation tanks. The plurality of exhaust stacks are connected to the plurality of separation tanks and are configured to exhaust hot gas produced by the burners to the environment, and the plurality of separation stacks are connected to the plurality of separation tanks and are configured to release steam produced by the plurality of separation tanks.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems, methods, and apparatus for recycling/disposing of production salt water. Rather than reinjecting or otherwise disposing of the production salt water, the production salt water can be heated in a tank to concentrate the salts in the fluid. The resulting product may include a solid or slurried salt composition having the majority of the water removed. The solid or slurried salt can be used as a product or further dried for use and/or disposal, while the water may be condensed and recovered. This may have the benefit of both reducing the volume of water to be injected or otherwise disposed of as well as providing the salts in a solid or slurry form that allows for simplified handling.

Figure 1:
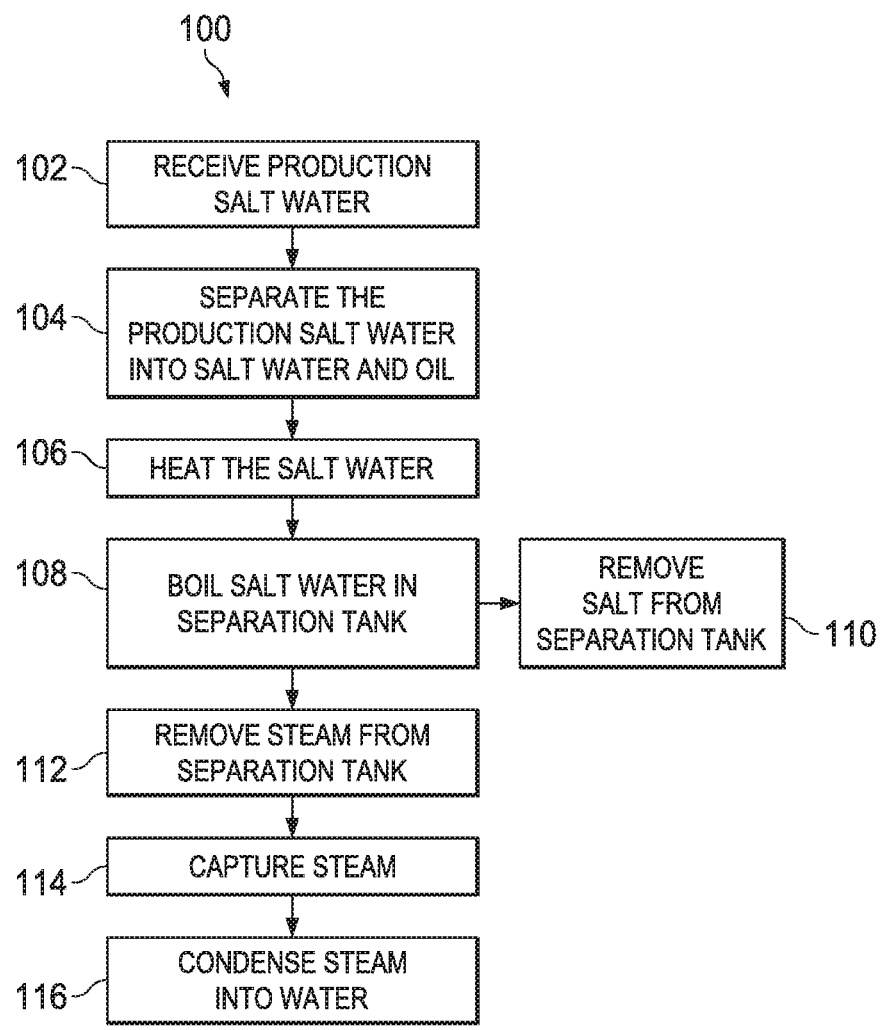
FIG. 1 is a process flow diagram of a method for recycling/disposing of production salt water.

FIG. 1 is a process flow diagram of a method 100 for recycling/disposing of production salt water. At block 102, production salt water is received. The production salt water may come from an oil well and comprise salt water and oil. In addition, the production salt water may be substantially the same composition as it was in a subterranean formation. However, the production salt water can come from any source and may comprise salt water, oil, and any other components. At block 104, the production salt water is separated into salt water and oil. The oil may be stored and sold. At block 106, the salt water is transferred to a heat exchanger and is heated. In an embodiment, the salt water is heated to no less than 2° F. of the boiling temperature of the salt water. For example, if the boiling temperature of salt water is 216° F., the salt water is heated to about 214° F. to about 215° F. At block 108, the heated salt water is transferred to a separation tank that boils the heated salt water. The boiling causes the salt water to separate into steam that rises to the top of the separation tank and salt that accumulates at the bottom of the separation tank. At block 110, the salt is removed from the separation tank. The salt may be periodically removed from the separation tank. For instance, a valve at a bottom of the separation tank can periodically open to release the salt. Alternatively, the salt could be continuously removed from the separation tank. The salt may be re-injected into the oil well to seal off the area within the formation or may be re-used for other purposes. At block 112, steam is removed from the separation tank. The steam is optionally passed through a steam trap then exhausted through a steam port at a top of the separation tank. In such a case, the steam is exhausted to the environment. Alternatively, the steam is captured at block 114. The captured steam may then be condensed into water at block 116. The recycled water may be of sufficient purity to be suitable for drinking, irrigation, cooling equipment, or aquifer regeneration.

Figure 2:
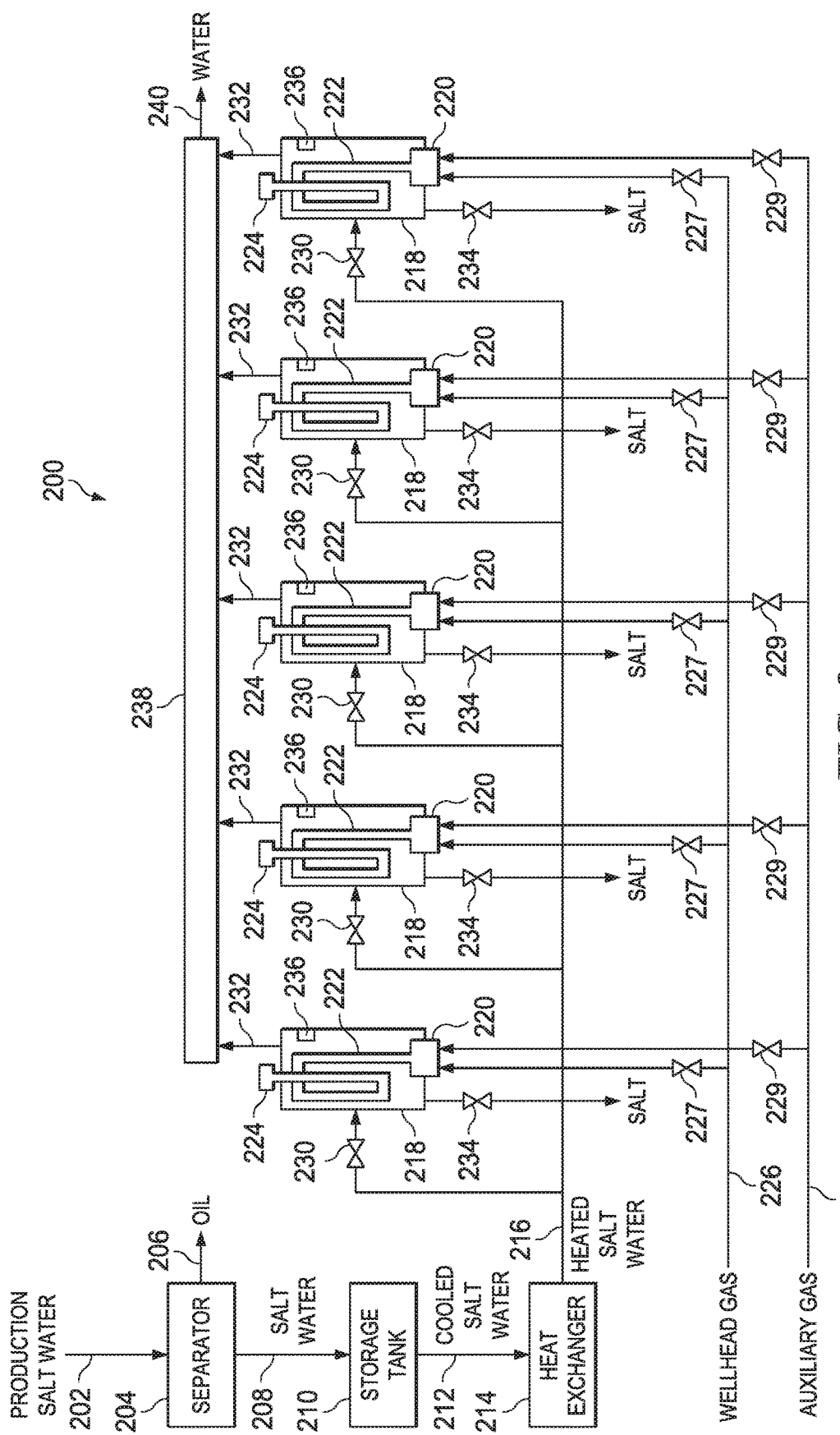
FIG. 2 is a schematic diagram of a system for recycling/disposing of production salt water.

FIG. 2 is a schematic diagram of a system 200 for recycling/disposing of production salt water. First, production salt water 202 (which may comprise water, salt, and hydrocarbons) is obtained and is sent to a separator 204. The separator 204 separates the production salt water 202 into oil 206 and salt water 208. The separator 204 may also pre-heat the production salt water 202, the oil 206, and/or the salt water 208. For instance, the separator 204 may heat the production salt water 102 to about 150° F. to promote the separation process. The separator 204 can include, but is not limited to, a settling tank (e.g., a gunbarrel settling tank), a heater treater, a free water knockout separator, and a vortex tube separator.

From the separator 204, the salt water 208 is sent to a storage tank 210. If the salt water 208 is heated before entering the storage tank 210, it may cool in the storage tank 210 and come out of the storage tank 210 at a lower temperature. For instance, in one embodiment, salt water 208 enters the storage tank 210 at 150° F., and the cooled salt water 212 leaves the tank at 100° F. However, embodiments are not limited to any particular temperatures and salt water 208 and cooled salt water 212 can have any temperatures below the boiling point of the salt water 208.

From the storage tank 210, the cooled salt water 212 is sent to a heat exchanger 214. The heat exchanger pre-heats the cooled salt water 212 to produce heated salt water 216. In an embodiment, heat exchanger 214 heats the cooled salt water 212 to a temperature about 5° F. below the boiling point of salt water, to a temperature about 2° F. below the boiling point of salt water, or to a temperature about 1° F. below the boiling point of the salt water. For example, if the boiling point of salt water is about 216° F., the heat exchanger 214 produces heated salt water 216 that is at a temperature of about 214° F. to about 215° F. The heat exchanger 214 is optionally a glycol line heater. The glycol line heater has internal tubes or coils and an outer shell. The cooled salt water 212 circulates within the tubes or coils, and heated glycol circulates between the outside of the tubes or coils and the inner wall of the outer shell. The glycol is heated by a burner, furnace, or by any other means and transfers the heat to the cooled salt water 212 through the tubes or coils. Alternatively, the heat exchanger 214 can include any other type of heat exchanger such as, but not limited to, a shell and tube heat exchanger, a plate heat exchanger, a plate and frame heat exchanger, and a double tube bundle shell and tube heat exchanger.

From the heat exchanger 214, the heated salt water 216 is sent to separation tanks 218. In one embodiment, an average of about 50 gallons per a minute of heated salt water 216 is sent to the separation tanks 218, and each separation tank 218 is about 75 inches tall with a diameter of about 36 inches. The separation tanks 218 operate in parallel to recycle/dispose of the heated salt water 216. In particular, the separation tanks 218 boil the heated salt water 216 to separate the salt and the water. In the example shown in FIG. 2, system 200 has five separation tanks 218. However, embodiments are not limited to any number of separation tanks 218 and may have more or less than the illustrated five. Additionally, due to the corrosive nature of salt water, each tank may be made corrosion resistant (e.g., by applying a corrosion-resistant coating or using materials having suitable corrosion resistance).

Each separation tank 218 has a burner 220, a burner tube 222, and a burner exhaust 224. The burner 220 receives fuel, burns the fuel to produce hot gas, and sends the hot gas through the burner tube 222 and out the burner exhaust 224. In one embodiment, each burner exhaust 224 may exhaust about 500,000 British thermal units per an hour (BTU/hr) of hot gas. The burner tube 222 is optionally configured to promote the transfer of heat from the hot gas to the heated salt water 216. For instance, burner tube 222 may be bent, have turns or convolutions, or circle itself to maximize the surface area of the burner tube 222 that is exposed to the heated salt water 216. For instance, each burner tube 222 can have a length of about 18.5 feet and a diameter of about 8 inches resulting in a surface area of about 5,600 square inches. The burner 220 may have multiple sources of fuel. A first source of fuel may be wellhead gas 226, which is natural gas directly from the wellhead (e.g., natural gas that has the same composition as it did in the subterranean formation). The wellhead gas 226 can be from the same well that produces the production salt water 202 or can be from any other well. In processes not utilizing the present disclosure, the wellhead gas 226 typically would be disposed of by flaring. In this scenario, the wellhead gas 226 is being burned, but is also providing the useful benefit of helping to Recycle/dispose of the production salt water 202. In case the wellhead gas 226 is unavailable, the system 200 has an auxiliary fuel 228 such as methane, ethane, propane, butane, natural gas, or any other hydrocarbon other than wellhead gas that can be used as a source of fuel for the burner 220. Additionally, each separation tank 218 has a wellhead gas valve 227 and an auxiliary fuel valve 229 that control whether each burner 220 is being fueled with wellhead gas 226 or auxiliary fuel 228. The wellhead gas valve 227 and the auxiliary fuel valve 229 can also optionally control the amount of fuel being supplied to the burner 220.

Each separation tank 218 further has a salt water valve 230, a steam port 232, a salt valve 234, and sensors 236. The salt water valve 230 controls the amount of heated salt water 216 that enters a separation tank 218. In one embodiment, the amount of heated salt water 216 that enters the separation tank 218 is based on the temperature of the salt water within the tank 218. For instance, the separation tanks 218 illustratively have an optimal operating temperature range that is above the boiling point of salt water. When the temperature within a separation tank 218 is above the optimal operating temperature range, the salt water valve 230 opens to let heated salt water 216 into the separation tank, which cools the separation tank 218. The salt water valve 230 may then stay open until the temperature within the separation tank 218 reaches the lowest temperature in the optimal temperature range. Accordingly, the temperature within the separation tanks 218 can be controlled to be within a range of temperatures. Alternatively, the salt water valve 230 can control the level of the salt water within the separation tank 218, and the burner 220 can control the temperature within each of the separation tanks. Furthermore, it should be noted that salt water valve 230 may have variable positions between fully open and fully closed, and that the terms "open" and "closed" may mean the salt water valve 230 is moved to the open position but not fully opened, or moved to the closed position but not fully closed, respectively.

As steam is generated by a separation tank 218, it flows upward towards the top of the separation tank 218 and is passed out of the separation tank 218 through the steam port 232. The steam comprises gaseous water that has much lower levels of impurities as compared to the incoming production salt water 202. In one test, the incoming production salt water 202 has impurities at the level of 18,000 parts per million (ppm) while the steam has impurities at the level of only 1 ppm. From the steam port 232, the steam can either be exhausted to the environment or can be captured, condensed, and re-used. In the example shown in FIG. 2, the system 200 has a steam trap 238 that is connected to the steam ports 232 of each of the separation tanks 218. The steam trap 238 receives the steam from each of the separation tanks 218 and returns any entrained water in the steam to the separation tanks 218. The collected steam may then be condensed by one or more condensers into clean water 240 that can be sent to a tank for later use.

In addition to producing steam, each separation tank 218 also produces salt. As the salt water within a separation tank 218 boils, the salt within the salt water settles out of the solution and accumulates at the bottom of the separation tank 218. The salt valve 234 for each of the separation tanks is positioned at the bottom of its separation tank 218. When the salt valve 234 is opened, salt that has accumulated in the separation tank 218 is removed. For instance, the salt valve 234 may be programmed to open for 5 seconds once every 30 minutes, or the salt valve 234 may be programmed to open for 3 seconds once every 20 minutes. However, embodiments are not limited to any particular times, and embodiments may open the salt valve 234 for any amount of time at any time interval.

The sensors 236 in each separation tank optionally include a temperature sensor, a pressure sensor, and a water level sensor. In one embodiment, the optimal operating temperature for the separation tanks 218 is about 223° F. to about 224° F., the optimal operating pressure for the separation tanks 218 is about 30 pounds per a square inch gauge (psig), and the optimal water level is two-thirds full. The output of the sensors (e.g., the temperature and pressure readings) is optionally used to control the salt water valve 230, the wellhead gas valve 227, the auxiliary fuel valve 229, and the water level within the separation tanks 218.

Figure 3:
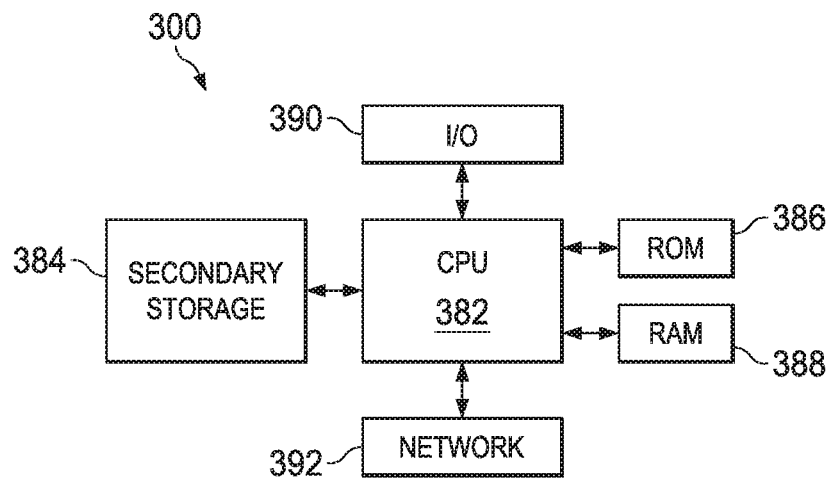
FIG. 3 is a schematic diagram of a computer system suitable for implementing systems for recycling/disposing of salt water.

FIG. 3 is a schematic diagram of a computer system 300 suitable for implementing one or more embodiments disclosed herein. For instance, the computer system 300 can be used to implement a control system (e.g., a programmable logic controller) for controlling the operations of system 200 in FIG. 2. The computer system 300 includes a processor 382, which may be referred to as a central processor unit or CPU, that is in communication with memory devices including secondary storage 384, read only memory (ROM) 386, and random access memory (RAM) 388. The processor 382 may also be in communication with input/output (I/O) devices 390 and network connectivity devices 392. The processor 382 may be implemented as one or more CPU chips.

It is understood that by programming and/or loading executable instructions onto the computer system 300, at least one of the CPU 382, the RAM 388, and the ROM 386 are changed, transforming the computer system 300 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, biometric input devices, or other well-known input devices. In an embodiment, the I/O devices 390 may include the sensors and valve actuators described herein.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. In some embodiments, the network connectivity devices 392 may enable the processor 382 to communicate with one or more of the components of the system 200 in FIG. 2 over one or more of the communication links. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 300 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 300 to provide the functionality of a number of servers that is not directly bound to the number of computers in the computer system 300. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 300 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

Figure 4:
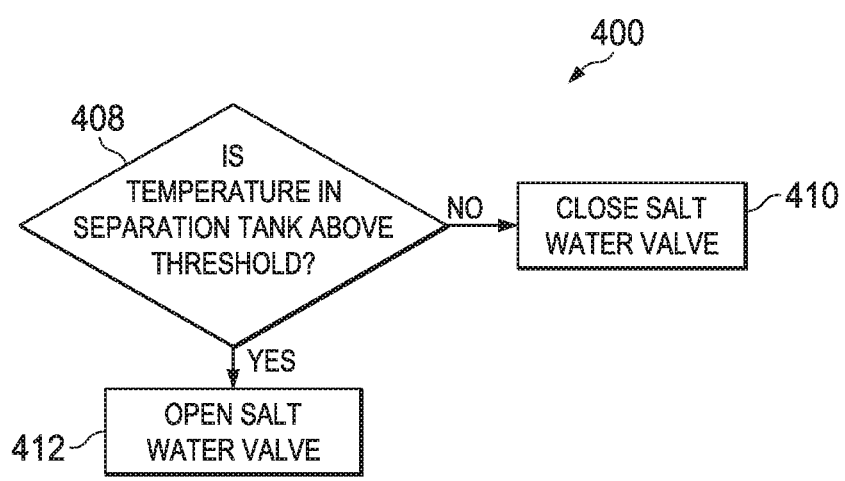
FIG. 4 is a process control diagram of a method for recycling/disposing of salt water.

FIG. 4 is a process control diagram of a method 400 for recycling/disposing of production salt water. Method 400 is illustratively an example of logic than can be implemented by computer system 300 in FIG. 3. At block 408, a determination is made whether the temperature within a separation tank is above a threshold temperature. If the temperature within the separation tank is not above the threshold temperature, a valve between the salt water and the separation tank is at least partially closed to prevent salt water from flowing into the separation tank at block 410. If the temperature within the separation tank is above the threshold temperature, the valve between the salt water and the separation tank is at least partially opened to allow salt water to flow into the separation tank at block 412.

Figure 5:
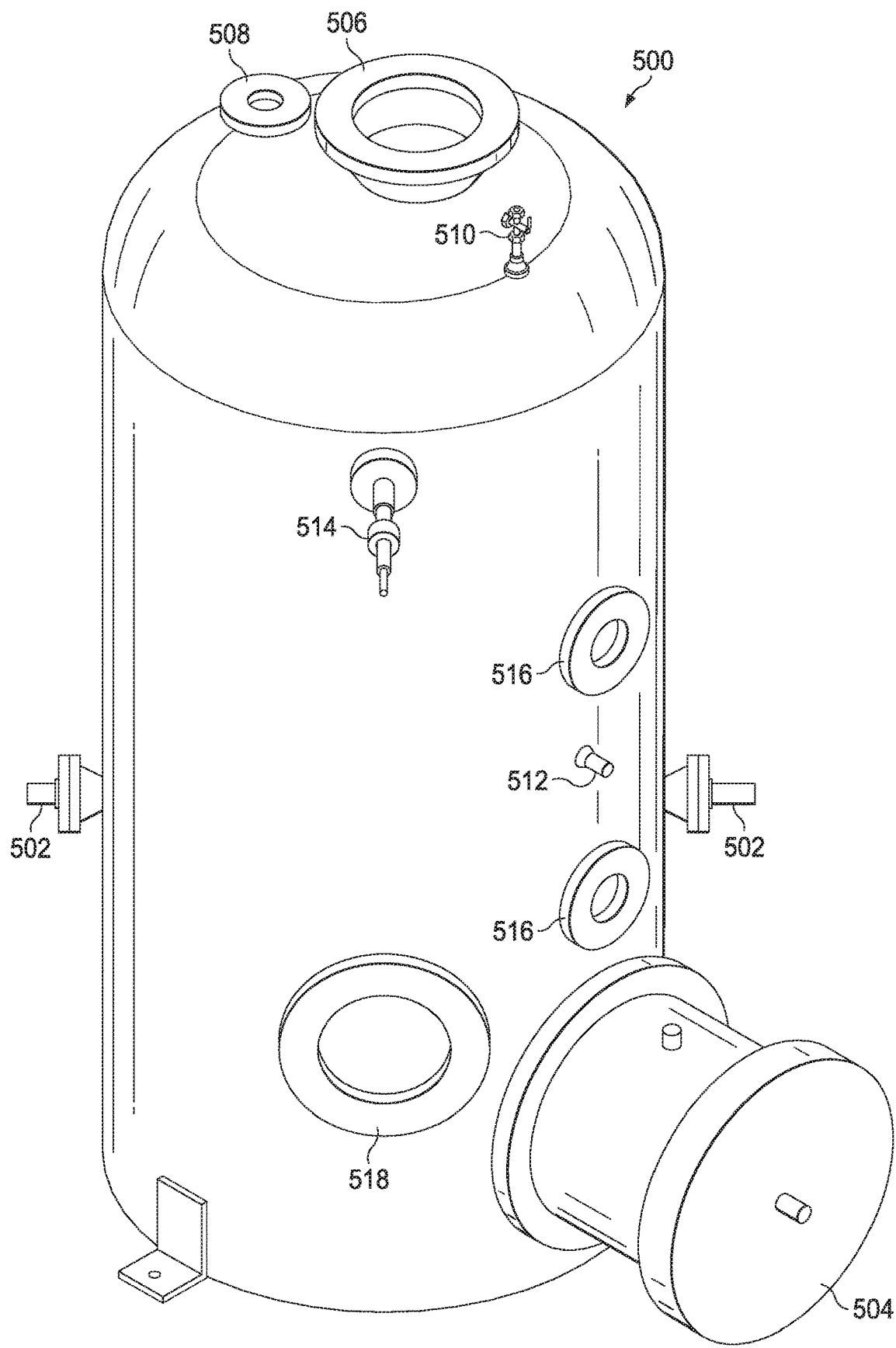
FIG. 5 is a perspective view of a separation tank for separating water from salt.

FIG. 5 is a perspective view of a separation tank 500 that can be used to separate water from salt. For instance, each of the separation tanks 218 in FIG. 2 may be the separation tank 500. The separation tank 500 has one or more salt water inlets 502. In one embodiment, the separation tank 500 has three salt water inlets 502 that are evenly spaced or about evenly spaced around the circumference of the separation tank 500. In the inside of the separation tank 500, each water inlet 502 is connected to a spray nozzle. The spray nozzles are optionally atomizing spray nozzles that spray a fine mist of salt water 360 degrees. The nozzles may point to the center of a separation tank or may be offset from the center to provide for water rotation within the separation tank. On the outside of the separation tank 500, all of the one or more salt water inlets 502 may be connected to one salt water valve (e.g., salt water valve 230 in FIG. 2) such that all of the one or more salt water inlets 502 either let salt water flow into the separation tank 500 or do not let salt water flow into the separation tank 500 at the same time (e.g., all three inlets are controlled with one valve).

The separation tank 500 further has a burner 504, an exhaust flange 506, a steam port 508, a pressure probe port 510, a temperature probe port 512, a safety valve 514, one or more sight glasses 516, and an inspection port 518. The burner 504 produces hot gas that is used to heat the salt water in the separation tank 500. In one embodiment, the burner 504 is a 500,000 BTU/hr burner that is fueled by a 714 cubic feet per hour flow of wellhead gas. The hot gas produced by the burner 504 flows through a burner tube and exits the separation tank 500 through the exhaust flange 506. The steam produced by the separation tank 500 leaves the top of the separation tank 500 through the steam port 508. The steam port 508 may be connected to a stream trap to capture any entrained water and return the water to the separation tank 500. The remaining steam may be sent to a condenser to condense the steam into water. Alternatively, the steam port 508 may be configured to exhaust the steam to the environment. The pressure probe port 510 contains a pressure sensor inserted into the separation tank 500, and the temperature probe port 512 contains a temperature sensor inserted into the separation tank 500. The safety valve 514 is configured to open and release steam if needed (e.g., if the pressure in the separation tank is above a preset threshold). The one or more sight glasses 516 allow an operator to view the inner contents of the separation tank 500. For instance, the one or more sight glasses 516 can be used by an operator to monitor the liquid level within the separation tank 500. In one embodiment, the optimal liquid level for the separation process is to have the liquid level about two-thirds full. Alternatively, separation tank 500 has a level sensor, and the level sensor is used to control the level within the separation tank 500. The inspection port 518 is optionally normally closed, but can be opened as needed to view or access the inside of the separation tank 500. For instance, the bottom of the separation tank 500 could be cleaned while not in operation by opening up the inspection port 518.

Figure 6:
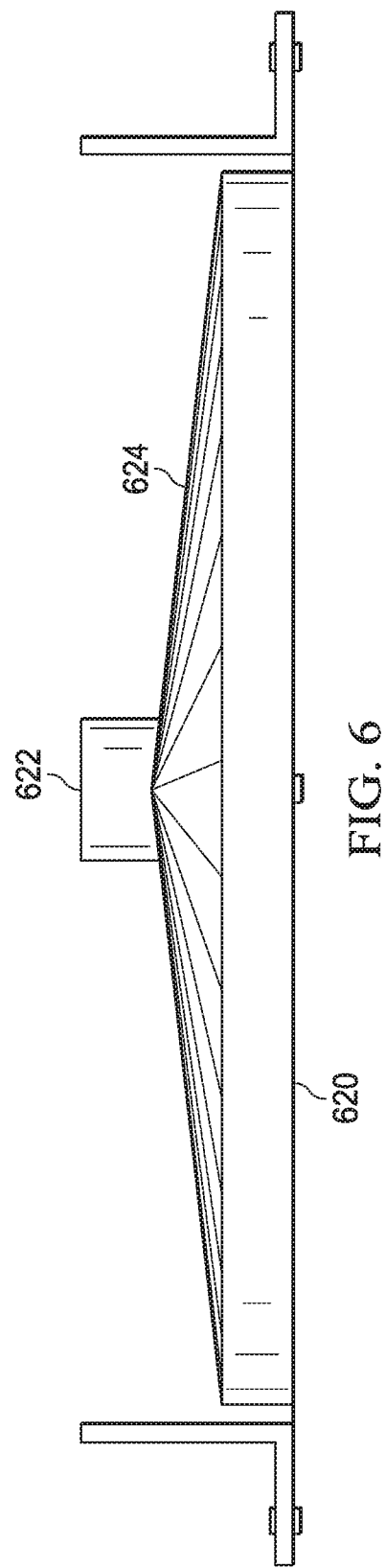
FIG. 6 is a side view of a recessed bottom for a separation tank.

FIG. 6 is a side view of a bottom 620 of a separation tank 500 (shown in FIG. 5). The bottom 620 has a salt port 622 that is used to remove salt from the separation tank 500. The salt port 622 is opened periodically by a salt valve (e.g., salt valve 234 in FIG. 2) for a predetermined amount of time (e.g., the salt port 622 may be opened for 5 seconds once every 30 minutes, may be opened 3 seconds once every 20 minutes, etc.) to allow accumulated salt to exit the separation tank 500. The bottom 620 also has a recessed bottom 624. The recessed bottom is highest in the center of the bottom 620 and is angled downward such that it is lowest at the outer edge of the separation tank 500. The angle may be 1.5 degrees, but the angle is not limited to any particular angle. Alternatively, the bottom 620 could be shaped to allow water and/or salt to drain to the center using gravity.

Figure 7:
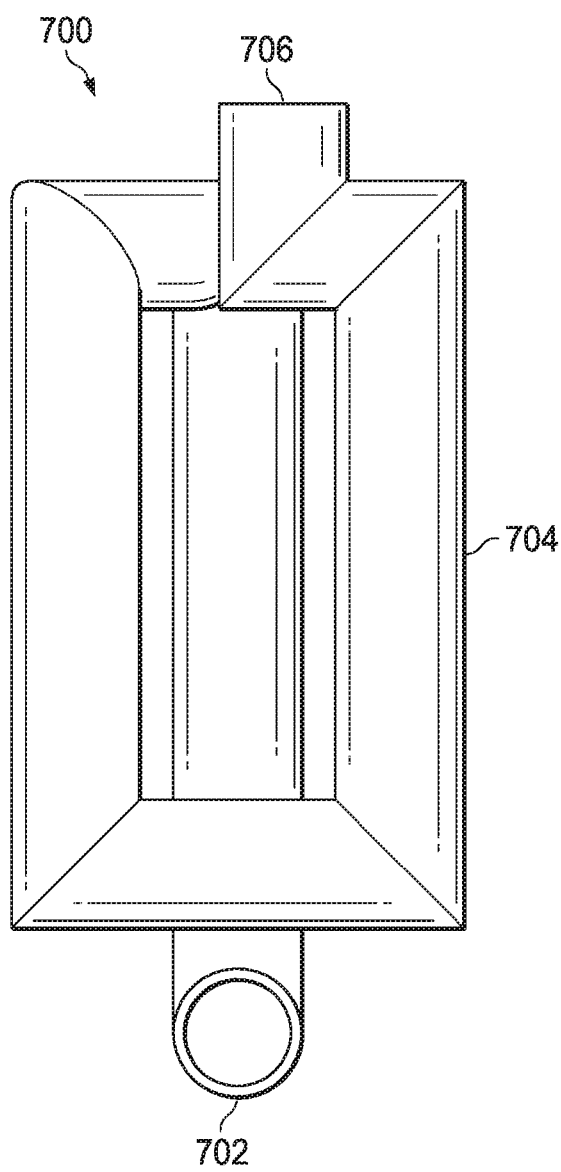
FIG. 7 is a front view of a burner tube.
Figure 8:
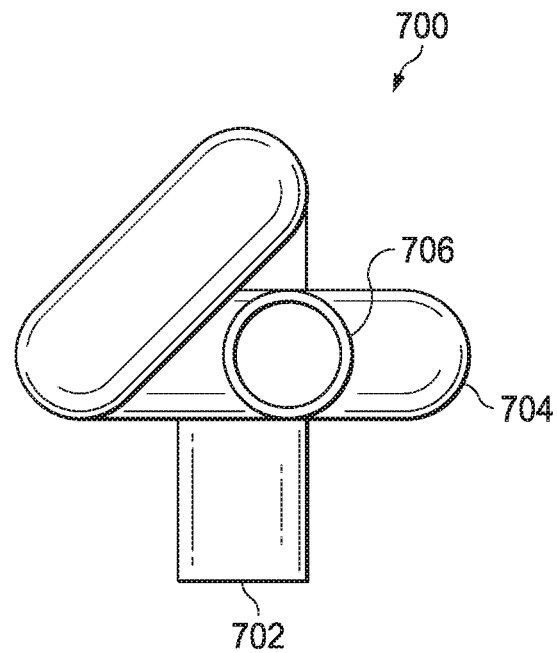
FIG. 8 is a top view of a burner tube.

FIG. 7 is a front view of a burner tube 700, and FIG. 8 is a top view of the burner tube 700. The burner tube 700 is optionally a burner tube such as burner tube 222 in FIG. 2. The burner tube 700 has a burner port 702 that is configured to be connected to a burner and receive hot gas from the burner. The burner port 702 is connected to the burner tube main body 704. The burner tube main body 704 is configured to transfer heat from the hot gas within the burner tube main body 704 to the salt water that is in the separation tank. In certain embodiments, the burner tube main body 704 is designed to have a relatively large surface area to increase heat transfer while also maintaining a large cross-section to allow a higher volume of exhaust gases to flow through. For instance, in the embodiment shown in FIGS. 7 and 8, the burner tube main body 704 has a number of 90 degree turns that increase the surface area of the burner tube main body 704 (e.g., 2, 3, 4, 5, 6, etc. number of 90 degree turns). At the end of the burner tube main body 704, the burner tube 700 has a burner tube exhaust port 706 that releases the hot gas from the burner tube 700.

Figure 9:
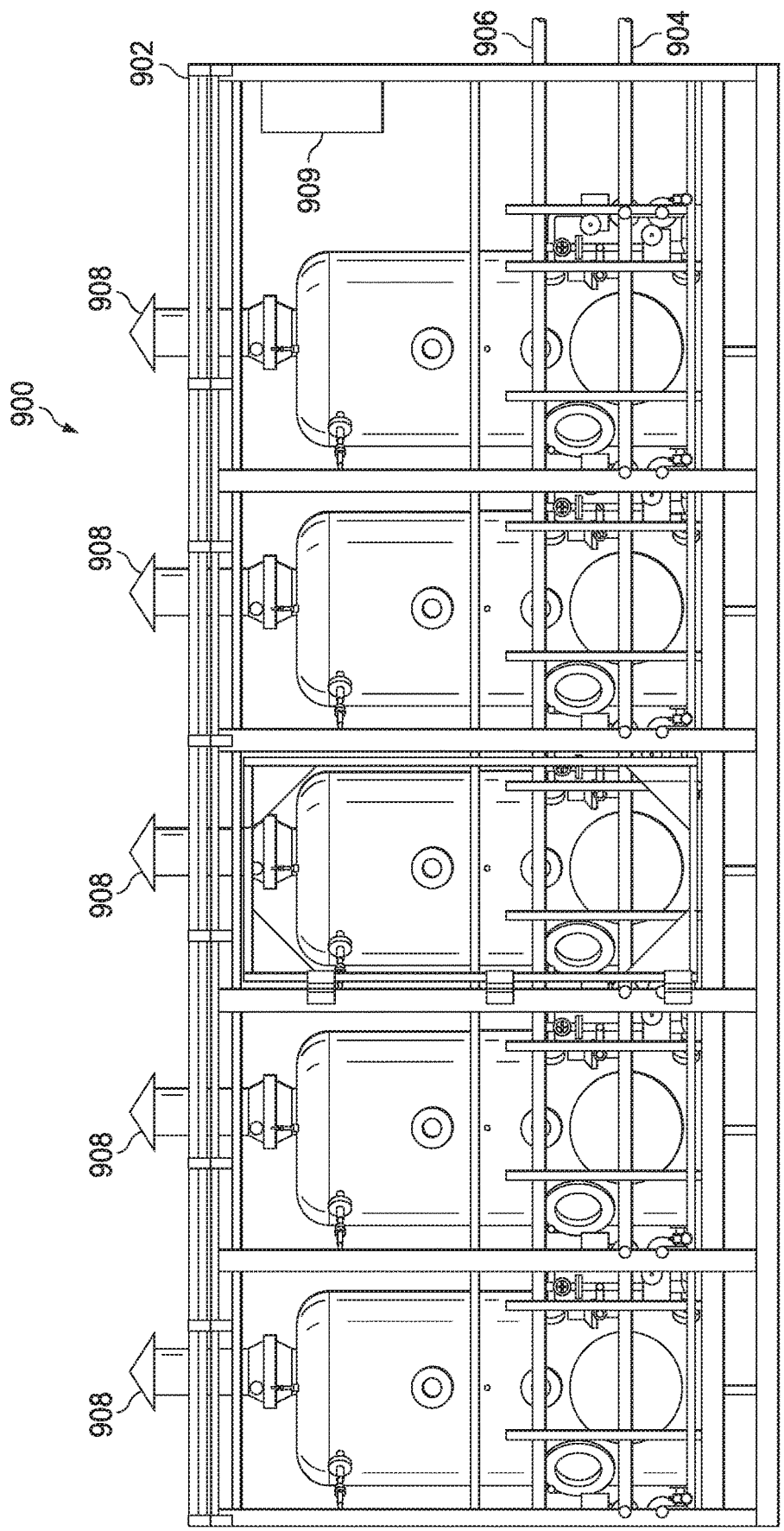
FIG. 9 is a front view of a skid-based system with the outer panels removed.

FIG. 9 is a front view of a system 900 for recycling/disposing of production salt water. The system 900 is in a skid format that allows for easy transportation and set-up of the system 900. For example, the system 900 can be built at a factory and then transported and set-up at a remote location with minimal work needed at the remote location. The system 900 has five separation tanks 500 that operate in parallel. However, the system 900 may have any number of separation tanks 500. The separation tanks 500 are mounted within and supported by the skid housing 902. The system 900 illustratively has twelve inlets and outlets. The inlets include one salt water inlet 904 that supplies salt water to the separation tanks 900, and one fuel inlet 906 that supplies fuel to the burners. The outlets include five burner exhaust outlets 908 and five steam outlets. The five steam outlets are not shown in FIG. 9, but the five steam outlets may come out the top of the skid housing 902 or out the rear panel of the skid housing 902. The system 900 also includes space for a control system 909.

Figure 10:
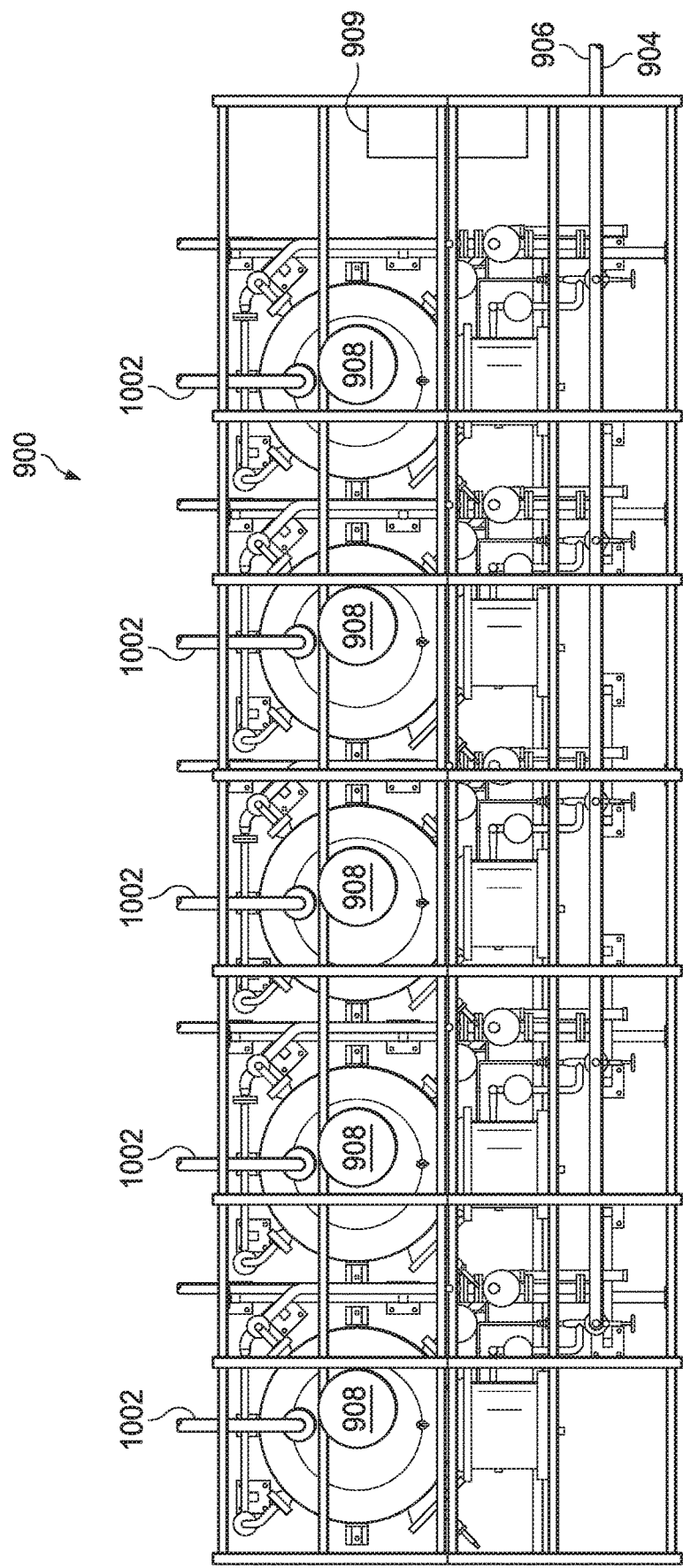
FIG. 10 is a top view of a skid-based system with the outer panels removed.

FIG. 10 is a top view of a system 900 for recycling/disposing of production salt water. The view in FIG. 10 shows the five steam outlets 1002. As can be seen in FIG. 10, the five steam outlets 1002 come out of the top of each separation tank and goes to the back of the system 900. As previously discussed, the five steam outlets 1002 may be exhausted to the environment or may be connected to a stream trap to capture the steam. FIG. 10 further shows the salt water inlet 904, the fuel inlet 906, and the five burner exhaust outlets 908 also shown in FIG. 9.

Figure 11:
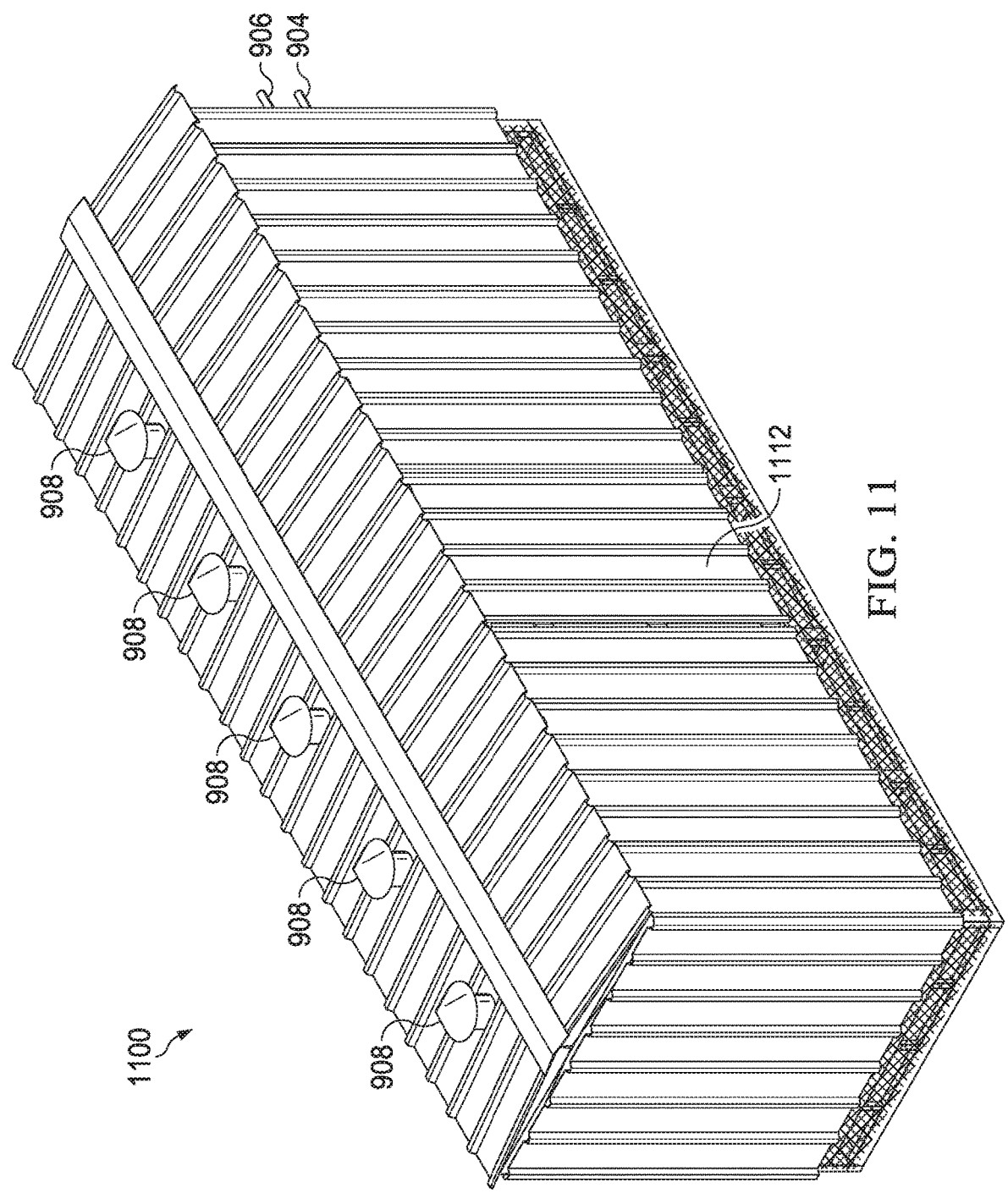
FIG. 11 is a perspective view of a skid-based system with the outer panels in place.

FIG. 11 is a perspective view of the system 1100 for recycling/disposing of production salt water shown in FIGS. 9 and 10 with the outer panels 1110 in place. As shown in FIG. 11, the system 1100 includes outer panels 1110 that cover the sides and the top of the system 1100, which allows for the system 1100 to withstand environmental conditions at an operating site. The system 1100 includes a door 1112 that allows for access to the equipment inside, and the system 1100 also includes the salt water inlet 904, fuel inlet 906, and exhaust outlets 908 shown in FIG. 9.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. As used herein, the term "about" means within 10% of the stated value unless otherwise indicated. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A skid-mounted system for recycling production salt water, comprising:
   a skid housing;
   a plurality of separation tanks enclosed within the skid housing, wherein each separation tank comprises a burner tube, and wherein each burner tube comprises multiple ninety degree bends to maximize a surface area of the burner tube;
   a programmable logic controller (PLC) enclosed within the skid housing;
   a salt water port configured to connect to a supply of salt water and transfer salt water to the plurality of separation tanks;
   a fuel port configured to connect to a fuel supply and provide fuel to burners attached to the plurality of separation tanks;
   a plurality of exhaust stacks that are connected to the plurality of separation tanks and that are configured to exhaust hot gas produced by the burners to an environment; and
   a plurality of steam stacks that are connected to the plurality of separation tanks and that are configured to release steam produced by the plurality of separation tanks.

2. The skid-mounted system of claim 1, wherein each of the plurality of separation tanks comprises:
   one or more sight glasses configured to allow an operator to view a liquid level in each separation tank;
   one or more salt water inlets configured to supply each separation tank with the salt water;
   a pressure probe configured to monitor a pressure within each separation tank;
   a temperature probe configured to monitor a temperature within each separation tank;
   a safety valve configured to release the steam within each separation tank; and
   an inspection port configured to provide the operator with access to an inside of each separation tank.

3. The skid-mounted system of claim 2, wherein the plurality of separation tanks comprises five separation tanks, wherein the one or more sight glasses comprises two sight glasses, and wherein the one or more salt water inlets comprises three salt water inlets.

4. The skid-mounted system of claim 1, wherein each separation tank comprises a recessed bottom, wherein the recessed bottom is angled downward from a center of the recessed bottom to an edge of the recessed bottom.

5. The skid-mounted system of claim 1, further comprising a plurality of panels covering a top and sides of the skid-mounted system to withstand environmental conditions at an operating site.

6. The skid-mounted system of claim 1, wherein an exhaust outlet extends through a panel covering a top of the skid-mounted system.

7. The skid-mounted system of claim 1, wherein the burner tube extends through each separation tank from the burner to the exhaust outlet.

8. The skid-mounted system of claim 1, further comprising a door to allow access into the skid housing.

9. The skid-mounted system of claim 1, wherein each separation tank comprises a temperature probe port and a pressure probe port.

10. The skid-mounted system of claim 1, wherein each separation tank comprises a sight glass to allow viewing of a liquid level within the separation tank.

11. The skid-mounted system of claim 1, wherein each separation tank comprises an inspection port to allow access to an inside of the separation tank.

12. The skid-mounted system of claim 1, wherein a bottom of each separation tank comprises a salt port configured to release salt from the separation tank.

13. A skid-mounted system for recycling production salt water, comprising:
   a skid housing;
   a separation tank enclosed within the skid housing, wherein the separation tank comprises a burner;
   a programmable logic controller (PLC) enclosed within the skid housing;
   a salt water inlet configured to connect to a supply of salt water and transfer salt water to the separation tank;
   a wellhead gas valve configured to direct wellhead gas, from an oil well, into the burner;
   an auxiliary fuel valve configured to direct non-wellhead gas into the burner;
   an exhaust outlet configured to exhaust hot gas produced by each burner to an environment;
   a steam outlet that is connected to the separation tank and that is configured to release steam produced by the separation tank; and
   a plurality of salt water inlets evenly spaced along a circumference of the inside of the separation tank, wherein each salt water inlet is configured to connect to the supply of salt water and transfer the salt water to the separation tank.

14. The skid-mounted system of claim 13, further comprising a plurality of panels covering a top and sides of the skid-mounted system to withstand environmental conditions at an operating site.

15. The skid-mounted system of claim 13, wherein a bottom of the separation tank comprises a salt port configured to release salt from the separation tank, wherein the salt port is controlled by a salt valve, and wherein the salt valve is controlled by the PLC.

16. The skid-mounted system of claim 13, wherein a burner tube extends through the separation tank from the burner to the exhaust outlet.

17. The skid-mounted system of claim 16, wherein the burner tube comprises multiple ninety degree bends to maximize a surface area of the burner tube.

18. The skid-mounted system of claim 13, wherein the steam outlet is fluidly coupled to a steam trap, and wherein the steam trap is configured to capture entrained water from the separation tank.

19. A skid-mounted system for recycling production salt water, comprising:
- a skid housing;
- a separation tank enclosed within the skid housing, wherein the separation tank comprises a burner, wherein a bottom of the separation tank comprises a salt port configured to release salt from the separation tank, wherein the salt port is controlled by a salt valve, and wherein the salt valve is controlled by a programmable logic controller (PLC);
- the PLC enclosed within the skid housing;
- a salt water inlet configured to connect to a supply of salt water and transfer salt water to the separation tank;
- a wellhead gas valve configured to direct wellhead gas, from an oil well, into the burner;
- an auxiliary fuel valve configured to direct non-wellhead gas into the burner;
- an exhaust outlet configured to exhaust hot gas produced by each burner to an environment; and
- a steam outlet that is connected to the separation tank and that is configured to release steam produced by the separation tank.

20. The skid-mounted system of claim 19, further comprising a burner tube extending through the separation tank from the burner, wherein the burner tube comprises multiple ninety degree bends to maximize a surface area of the burner tube.

* * * * *